United States Patent [19]

Blanchard

[11] 4,157,462

[45] Jun. 5, 1979

[54] SENSOR

[75] Inventor: Houston F. Blanchard, Santa Barbara, Calif.

[73] Assignee: General Motors Corporation, Detroit, Mich.

[21] Appl. No.: 845,607

[22] Filed: Oct. 26, 1977

[51] Int. Cl.² ............................................. H01H 35/14
[52] U.S. Cl. .......................... 200/61.45 R; 200/61.53; 200/DIG. 45
[58] Field of Search .................... 73/503, 514, 517 R, 73/517 AV; 251/DIG. 2; 200/61.45, 61.53, 153 R, 67 DB, DIG. 45, 61.45 R, ; 340/262

[56] References Cited

U.S. PATENT DOCUMENTS

| | | | |
|---|---|---|---|
| 3,467,139 | 9/1969 | Richards | 137/625.48 |
| 3,471,668 | 10/1969 | Wilkes | 200/DIG. 45 |
| 3,567,881 | 3/1971 | Duimstra et al. | 200/61.53 |
| 3,571,540 | 3/1971 | Richards | 200/67 DB |

*Primary Examiner*—James R. Scott
*Attorney, Agent, or Firm*—Herbert Furman

[57] ABSTRACT

A velocity or acceleration responsive sensor includes a housing having a cavity including a pair of spaced side walls which taper relative to each other and define a predetermined included angle. The side walls are joined by proximal and distal end walls. A pair of bands of flexible spring material within the housing cavity are of generally figure 8 configuration. The bands are of generally elongate shape, with their adjacent abutting portions located coplanar with the bisector of the included angle and their remote portions bearing on the side walls of the cavity. The abutting portions are commonly secured to each other and each remote portion is secured to a respective side wall. The force of the bands tending to return from their elongate shape to their free shape urges the bands toward the distal end wall of the cavity to provide a preload force. When a predetermined velocity change or acceleration change occurs, the bands roll along the side walls oppositely of each other and further elongate relative to the proximal end wall. Electrical contacts adjacent the proximal end walls are contacted by the bands to complete a circuit across a source of power and a device to be actuated.

7 Claims, 10 Drawing Figures

SENSOR

FIELD OF THE INVENTION

This invention relates generally to sensors and more particularly to a roller band sensor.

SUMMARY OF THE INVENTION

The sensor of this invention is a spring mass system which follows the same physical laws as any other undamped spring mass system. However, it differs from prior known spring mass systems in that it includes, in its preferred embodiment, a pair of bands of flexible spring material in a generally figure 8 configuration. The bands both roll and elongate relative to each other during concurrent movement between a preload position and an actuated position. The bands are constrained from their free shape to an elongate shape by a pair of tapered walls of a housing which define a predetermined included angle. In the preload position, the bands have abutting portions located coplanar with the bisector of the included angle and remote portions engaging the side walls in surface to surface relationship. The abutting portions are commonly secured to each other and each remote portion is secured to a respective side wall. The integral biasing force of the bands tending to return to their free shape provides a preload force resisting movement of the bands toward actuated position and urging the bands into engagement with stops to thereby set the preload position.

Under a velocity change of predetermined extent and time, or an acceleration of predetermined amplitude and time, the bands move through a predetermined distance to actuated position as the bands roll oppositely of each other along their respective side walls and further elongate. The abutting portions of the bands always remain in tangential contact with each other as the bands roll and elongate and likewise the remote portions of the bands always remain in tangential contact to a respective side wall. When the bands move through the predetermined distance to actuated position, the bands engage contacts which complete an electrical circuit across a source of power and a device to be actuated.

One feature of this invention is that little or no coulomb friction is generated during rolling of the bands. A small amount of rolling friction may exist although none has been detected at this time. Coulomb friction may be involved in the engagement and disengagement of the bands with their respective contacts in order to assure some minimum wiping motion between the bands and such electrical contacts for improved electrical continuity.

Another feature is that the spring rate of the bands remains the same as the bands move from preload position to actuated position and the force required for the bands to both roll and elongate increases as the bands move toward actuated position. This insures that the bands will not reach their actuated position unless the velocity change or the acceleration of predetermined amplitude occurs within a predetermined time interval during which it is desired that the sensor operate.

A further feature is that the entire sensor is of minimum size and package since the sensor contains only a minimum number of components necessary for operation, a housing, the bands, and the contacts. Yet another feature is that the spring rate of the bands can be changed by changing the included angle between the side walls without changing the bands. The spring rate can be increased by increasing the included angle, or can be decreased by decreasing the included angle. Alternatively, the included angle can remain constant and the spring rate increased by increasing the band thickness, or decreased by decreasing the band thickness.

Yet a further feature is that the moving mass of the sensor is provided solely by the bands and no concentrated mass or weight need be added to the bands. The moving mass of the sensor is provided by the mass of: the abutting portions of both bands; the common securing means between such portions and the forward and rearward arcuate portions of each band between their lines of tangency with a respective abutting portion and side wall.

Still another feature is that the sensor may be undamped or air damped, as desired.

Yet another feature is that the actuation velocity threshold increases or decreases as a function of the cosine of the angle of the input force. As the angle increases, the actuation velocity threshold increases and as the angle decreases, the actuation velocity threshold decreases.

BRIEF DESCRIPTION OF THE DRAWING

These and other features of the invention will be readily apparent from the following specification and drawings wherein.

DESCRIPTION OF THE PREFERRED EMBODIMENTS

Figure 1:
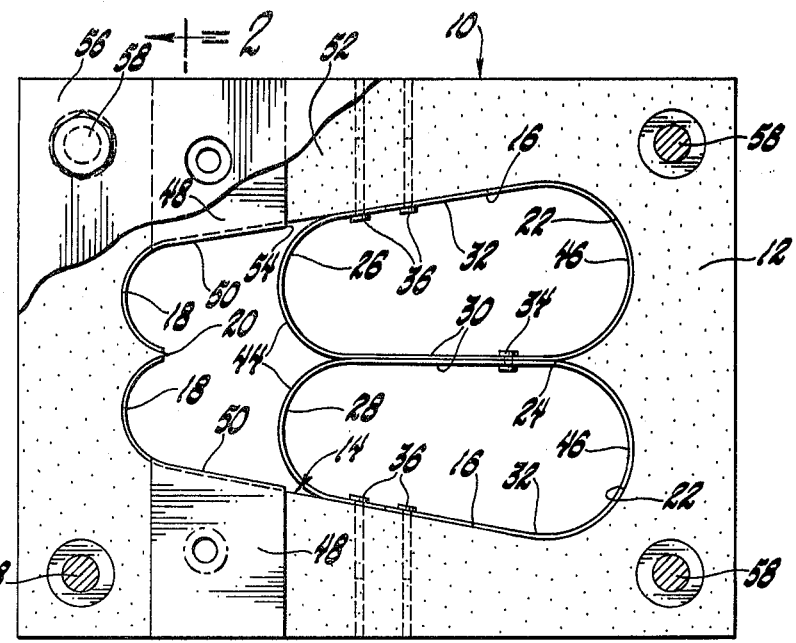
FIG. 1 is a partially broken away elevational view of a sensor according to this invention.
Figure 2:
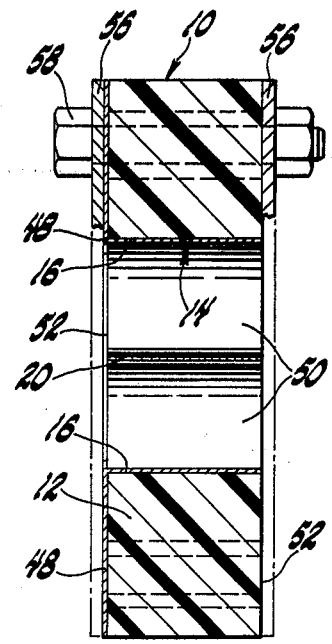
FIG. 2 is a sectional view taken generally along the plane indicated by line 2—2 of FIG. 1.
Figure 3:
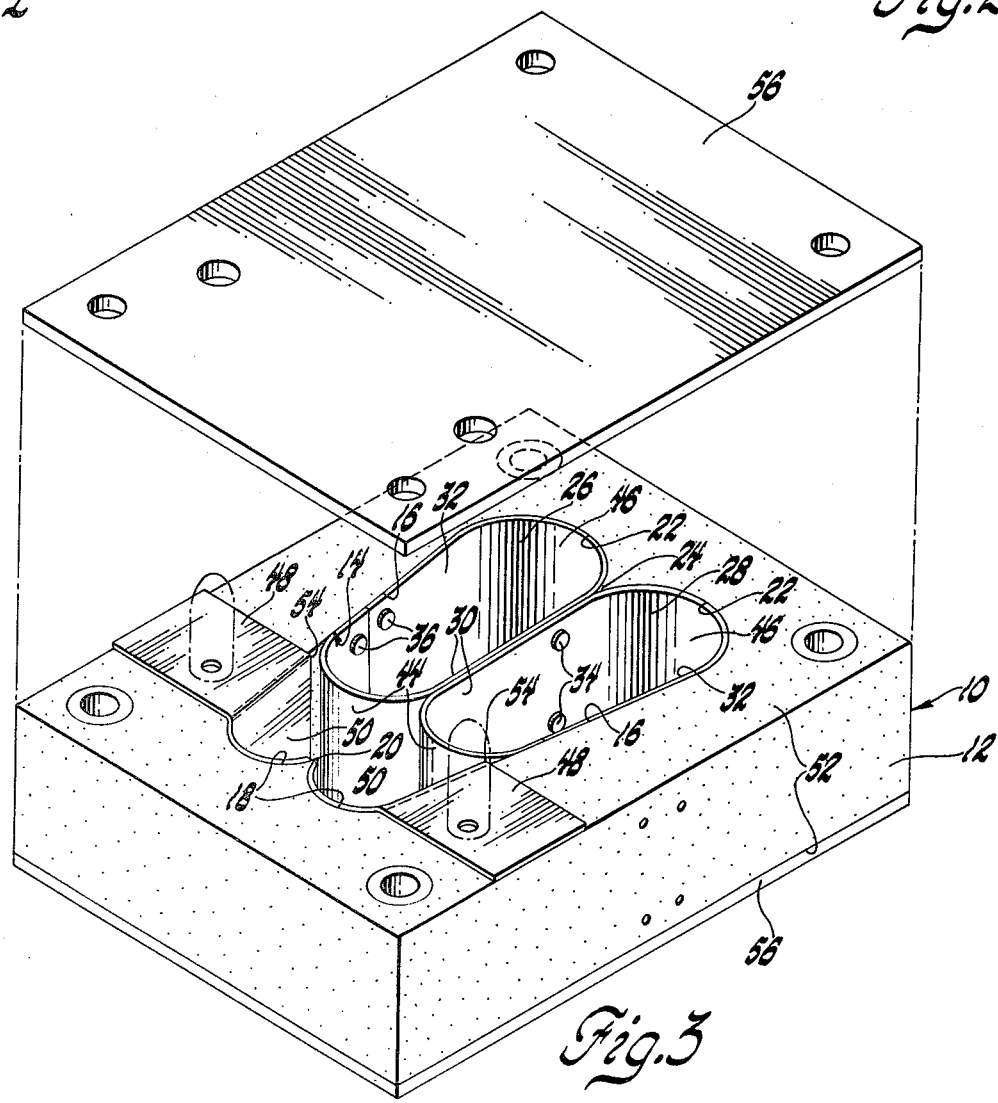
FIG. 3 is an exploded perspective view.

Referring now to FIGS. 1, 2, 3 and 4 of the drawing, a sensor 10 according to this invention includes a housing 12 of electrical non-conductive material, such as fiber reinforced plastic. In addition to the housing being nonconductive, it should also be stable as to shape and dimension under all ambient conditions likely to be encountered during use of an automobile or other article on which the sensor will be mounted.

The housing 12 includes a cavity 14 which is either molded or machined therethrough. The cavity 14 includes a pair of elongate bearing portions or side walls 16 which taper relative to each other and tangentially merge at their proximal ends into arcuate end walls 18. Walls 18 merge with each other at 20 and cooperatively define the proximal end wall of cavity 14. The distal ends of the walls 16 tangentially merge into arcuate end walls 22 which merge with each other at 24 and cooperatively define the distal end wall of cavity 14. The side walls 16 define a predetermined included angle, the bisector of which would be coplanar with the mergers 20 and 24 of the end walls 18 and 22 respectively. In the embodiment shown, the included angle is 16.6 degrees. While this angle may vary, it is believed that the angle can range between 5 and 30 degrees.

A pair of bands 26 and 28 of flat spring steel material are located within the cavity 14. The bands 26 and 28 are generally of figure 8 configuration and have adjacent abutting side portions 30 located coplanar with the bisector of the included angle and remote side portions 32 engaged in surface to surface relationship with a respective side wall 16.

The abutting portions 30 of the bands 26, 28 are commonly anchored to each other at 34 by rivets aligned transversely of the bands, and the remote side portion 32 of each band is also anchored at 36 to a respective side wall 16 by rivets aligned transversely of a respective band. The bands should not move relative to each other at the common anchor 34 and each band likewise should not move relative to a side wall 16 at a respective anchor 36.

Each band in effect between its anchor 36 at a respective side wall and the common connection or anchor 34 has effective continuity. In the embodiment shown, each band is formed of a strip of spring steel material, with the ends of the band abutting each other at anchors 36. In the specific embodiment shown, the bands are formed of strips of high carbon spring steel, such as AISI 1095, precision ground to be thickness of 0.0015 inches. The thickness of the band may, of course, vary but it is believed that the bands preferably may range in thickness between 0.0010 inches to 0.0040 inches in increments of 0.0005 inches.

Figure 6:
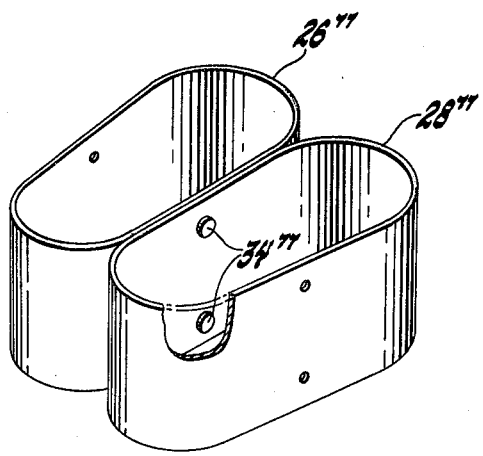
FIG. 6 is a perspective view of an alternate embodiment.
Figure 7:
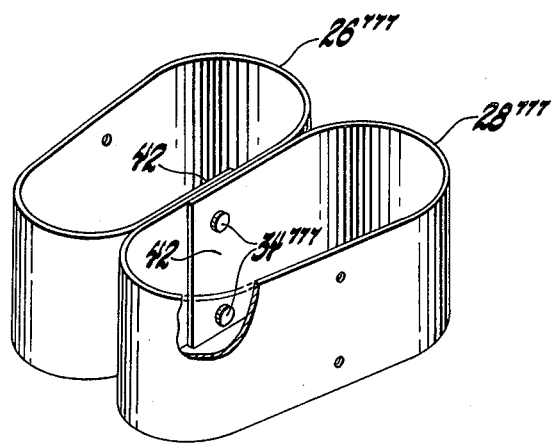
FIG. 7 is a perspective view of an alternate embodiment.
Figure 5:
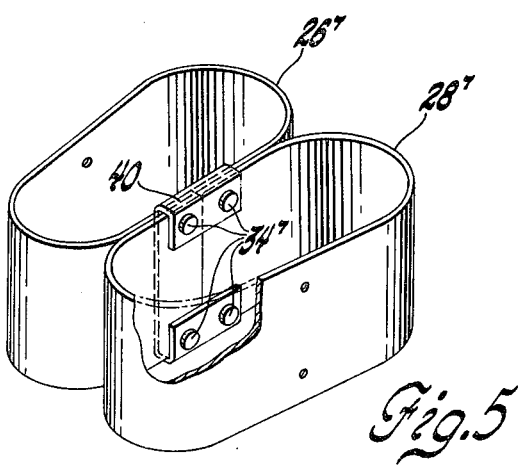
FIG. 5 is a perspective view of an alternate embodiment.
Figure 8:
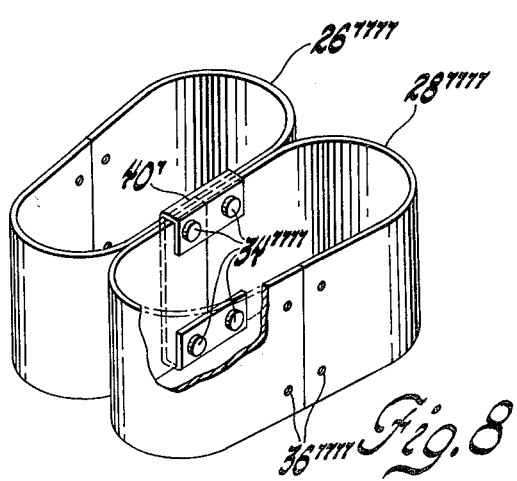
FIG. 8 is a perspective view of an alternate embodiment.

Although the bands 26, 28 are shown with the free edges of each abutting at the anchors 36, the free ends likewise can overlap each other at the anchor 36 to a respective side wall 16. As long as there is effective continuity between the anchor 36 of the band on a respective side wall 16 and the common anchor 34, other band configurations may be employed such as schematically indicated in FIGS. 5, 6, and 7 of the drawings. In FIG. 5 the free abutting ends of the bands 26', 28' are commonly clamped to each other by a suitable clamp 40 and rivets to provide the common anchor 34'. In FIG. 6 the bands 26'', 28'' are completely continuous and each may be formed from tube stock. In FIG. 7 the bands 26''', 28''' are provided by one continuous strip formed into a figure "8" pattern with the free ends 42 of the strip engaging and commonly anchored at 34''' to the common center portion to provide the effective continuity required. In FIG. 8 each band 26'''', 28'''' is formed from two strips of material, with the remote free ends of the two strips of each band either abutting, as shown, or overlapping at the anchors 36'''' on the side walls 16 and with the adjacent free ends of the two strips of each band either overlapping or abutting each other, as shown, and being commonly secured at 34'''' by a clamp 40' and rivets as in FIG. 5.

Each band 26, 28 in its free position has a generally circular shape. When the bands are disposed between the side walls 16 of the cavity 14, the bands are forced or constrained to elongate and assume the shape shown in FIG. 1. The free figure 8 band configuration is shortened along its major axis since the free length of the configuration is less than the distance between the side walls 16 normal to the bisector of the included angle defined thereby. The proximal or forward arcuate portions 44 of each band tangentially merge with each other and with a respective side wall 16 and tangentially interconnect the adjacent and remote side portions 30, 32 respectively of each band, forwardly or proximally of anchors 34, 36. Likewise, the distal or rearward arcuate portions 46 of each band tangentially merge with each other and tangentially interconnect the adjacent and remote side portions 30, 32, respectively, of each band rearwardly or distally of anchors 34, 36. The portions 44 and 46 of the bands are not true radii, but are defined mathematically by incomplete elliptic integrals and form a shape known as an elastica. An elastica or elastic line is defined as that shape formed by a straight beam deflected within the elastic limit of the material. The end walls 18, 22 preferably match the profile or shape of respective band portions 44, 46 although they can be true radius walls if desired. By matching the shape of walls 18 and 22 to that of respective band portions 44, 46, stress lines or risers in the bands which may affect the performance of the sensor, are avoided. The integral forces of the bands tending to return the bands to their free generally circular shape forces the bands toward the end walls 22 of the housing cavity 14 to maintain the bands in the preload position shown and provide a preload force resisting movement of the bands toward the end walls 18 of the cavity 14 as will be further described. While the bands 26, 28 have a free generally circular shape, they may be prestressed to other free shapes, such as ovular, to reduce fatigue stresses induced by long term storage. Likewise, while it is preferable that the preload force be integrally provided by the bands and angularly related side walls 16, it should be noted that such preload force can be increased by magnets on walls 22 or provided for entirely by magnets if walls 16 are parallel or substantially parallel to each other.

The anchors 34, as well as any clamps used therewith, must be located forwardly of the line of tangency between arcuate portions 46 in the preload position of the bands.

The bands 26, 28 provide a moving mass which is subject to a velocity change of predetermined extent and time or an acceleration of predetermined amplitude and time applied to the automobile or other article on which the sensor is mounted. This moving mass includes the weight of the adjacent abutting side portions 30 of each of the bands; the weight of the rivets, eyelets or clamp providing the anchor 34; the weight of the proximal arcuate portions 44 between their lines of tangency with portions 30 and wall 16; and the weight of the distal arcuate portions 46 between their lines of tangency with portions 30 and walls 16. In the specific embodiment shown, the bands 26, 28 each weigh 0.315 grams and the rivets or eyelets providing anchor 34 weigh 0.0625 gram. The moving mass which, of course, is less than the total weight of the bands and the rivets or eyelets providing anchor 34, is thus of extreme light weight.

Figure 4:
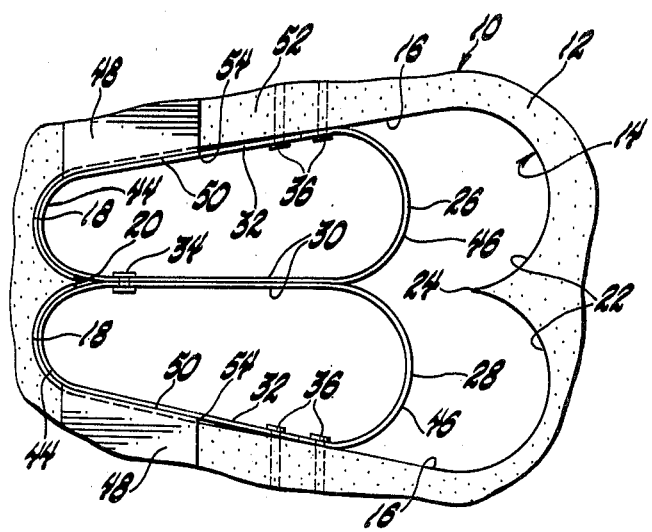
FIG. 4 is a view similar to FIG. 1 showing the sensor in actuated position.

When the bands 26, 28 move to actuated position shown in FIG. 4 wherein the proximal arcuate portions 44 engage respective end walls 18, each band rolls oppositely of the other along a respective side wall 16 as abutting side portions 30 forwardly or proximally of anchor 34, tangentially merge into continuations of the arcuate proximal portions 44 which continuously tangentially separate from each other and tangentially move into engagement with side walls 16 as continuations of remote side portions 30 forwardly of anchor 36.

Concurrently, the distal arcuate portions 46 tangentially merge into each other as continuations of abutting side portions 30 rearwardly or distally of anchor 34 while remote side portions 32 tangentially separate from walls 16 rearwardly or distally of anchor 36 and tangentially merge into continuations of distal arcuate portions 46. As the bands 26, 28 so roll, the bands concurrently further elongate within the cavity 14 since the walls 16 taper toward each other. This elongation results in the arcuate proximal and distal portions 44 and 46 being formed on continuously decreasing arcs as evident from a comparison of FIGS. 1 and 4. This further elongation also results in the bands 26, 28 being placed in tension to overcome the reaction forces of the walls 16 and 22 against the bands in the preload position.

From the foregoing, it can be seen that parts or areas of the abutting side portions 30 and remote side portions 32 of bands 26, 28 never respectively disengage from each other or wall 16 and are uninvolved at all times in the formation of arcuate portions 44 and 46. The anchors 34 and 36 should be located in such parts or areas to ensure that such anchors are never in or close to an area of tangential contact of the bands with each other or with walls 16 so as to affect the performance of the sensor. The transversely aligned rivets of anchor 34 need not be aligned with those of anchors 36, as shown, and the anchor 34 can be arranged in various relationships to the anchors 36. However, anchors 34 and 36 should not affect any tangential contact area of the bands, either with respect to each other or walls 16, in any position thereof.

A thin angular electrical contact 48 is adhesively secured to a base wall 52 of housing 12 and includes a contact member 50 adhesively secured to each of the side walls 16. The contact member 50 covers a predetermined portion of the wall 16 and a respective end wall 18. In the specific embodiment shown, the contact member 50 is 0.001 inches thick and the adhesive securing the contact member to the walls 16 and 18 is of the same thickness. Thus, the rear or trigger edge 54 of each contact member 50 is slightly spaced, 0.002 inches from a respective wall 16.

As the bands concurrently roll along their respective side walls 16 and elongate during movement to actuated position, no coulomb friction is generated. A small amount of rolling friction may be involved although none has been detected at this time. However, as each band engages the edge 54 of a respective contact member 50, the trigger position, some coulomb friction occurs. This is desirable at this position since the wiping contact insures increased electrical continuity between the band and the contact member. After this initial engagement at the trigger position, the bands continue to concurrently roll and elongate to actuated position, FIG. 4, and move across each of the contact members 50 in surface to surface engagement therewith.

The bands 26 and 28 have a predetermined spring rate. This spring rate will be changed if the included angle between the side walls 16 is changed. An increase in the included angle increases the spring rate while a decrease in the included angle decreases the spring rate. While the bands do elongate during their movement to actuated position, the spring rate remains the same and therefore the force required to continue movement of the bands continuously increases as the bands move from their preload position to their actuated position due to the tapered walls 16. The spring rate is defined by the force applied at the common anchor 34 divided by the change of displacement of the common anchor.

As the bands move from preload to actuated position, the total distance of travel of the center of each arcuate proximal portion 44 will be slightly more than one-half the total distance of travel of the common anchor 34 between the bands. If the side walls 16 are parallel to each other rather than tapering toward each other, the distance of travel of the centers of the arcuate proximal portions 44 would be one-half that of the distance of travel of the common anchor. However, while the tapered walls 16 require that the arcs of each of the arcuate proximal portions 44 continuously decrease as the bands travel from preload to actuated position, the bands elongate so that the travel distance of the proximal portions will be slightly more than one-half of the travel distance of the common anchor 34.

It is preferable that the sensor be mounted in vertical attitude on the automobile, with the bands 26 and 28 disposed vertically of each other. The sensor, of course, could be mounted with the bands disposed horizontally of each other or in other attitudes if so desired. The particular sensor shown herein is intended to sense forces applied to the automobile within an included angle of 30 degrees to either side of the vehicle center line when the sensor 10 is mounted on such center line in vertical attitude. The forces which the moving mass actually experiences will vary with the cosine of the applied input force to the center line of the vehicle. Thus, if the input force applied to the vehicle is at a 30 degree angle to the center line of the vehicle, the resultant force experienced by the moving mass will be reduced by a factor of 0.866, the cosine of 30 degrees.

It is desirable that the sensor 10 be of minimum size. This requires that the housing 12 be of minimum width, length and depth. The depth is controlled by the minimum depth of the cavity, which, in turn, is controlled by the selected band width. The width is controlled in part by the amount of material required to provide side walls 16 and avoid distortion due to torsional and other bending of the housing. The width is also controlled by the size of cavity 14. The transverse minimum span or spacing of the side walls 16 normal to the bisector of cavity 14 at the lines of tangency between the side walls 16 and the end walls 18 is controlled by the proportional limit of the selected band material. This spacing must be such as not to induce any stress lines or risers in the arcuate portions 44 of the bands 26, 28 in the actuated position thereof since the sensor 10 is automatically resettable and the avoidance of such stress lines or risers is necessary in order not to degrade multiple sensor performance. The maximum span or spacing of the side walls 16 normal to the bisector of cavity 14 at the lines of tangency between the side walls 16 and the end walls 22 is controlled by the desired mass travel distance of the moving mass. This maximum span also affects the preload force, which is inversely proportional to the square of the maximum span, and the spring rate of the bands. The spring rate and the preload can each be expressed as follows:

$$R_s \approx C/X^3 \sin^2\theta/4$$

$$F_o \approx C/X^2 \sin\theta/4$$

$R_s$ = Spring rate
$F_o$ = Preload
$C$ = Constant
$X$ = Maximum span perpendicular to center line of cavity 14

θ = Included angle of side walls 16

The opposite sides of the cavity 14 are closed by flat cover plates 56. These cover plates fit on opposite sides of the cavity and are secured to housing 12 at 58. The edges of the spring bands 26, 28 can be spaced from 0.005 to 0.030 inches from the covers. Preferably, the clearances should be the same between the band edges and each cover. When the clearance between the bands and the covers is at a minimum, such as 0.005 inches, air damping will occur as the bands 26, 28 move to actuated position due to slight compression of ambient air in the compression zone between the proximal portions 44 of the bands and walls 18, a slight vacuum occurring in the vacuum zone between the distal portions 46 of the bands and walls 22, and the transition between compression and vacuum occurring in the transition zone within the bands 26, 28. The build up of pressure in the compression zone is at a much slower rate than the rate of build up of vacuum in the vacuum zone. Thus, an input force of short duration results in a high build up of vacuum in the vacuum zone and a minimum build up of compression in the compression zone. The rate of buildup of vacuum and pressure is dependent on the clearance between the band edges and covers, and at a clearance of 0.030 inches, no measurable damping occurs.

Figure 9:
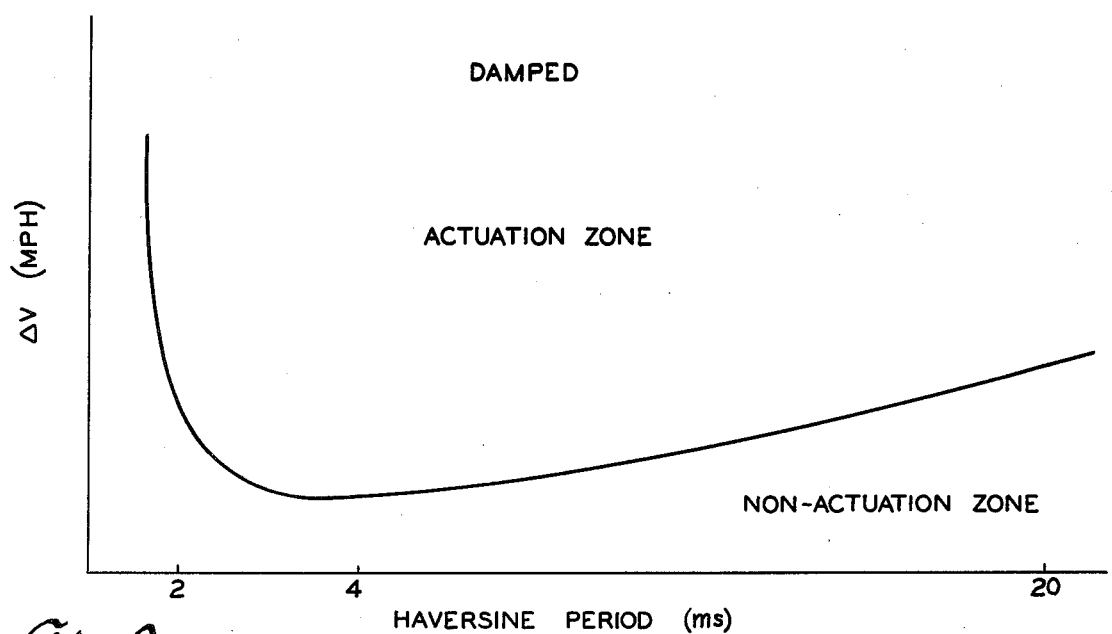
FIG. 9 is a diagram.
Figure 10:
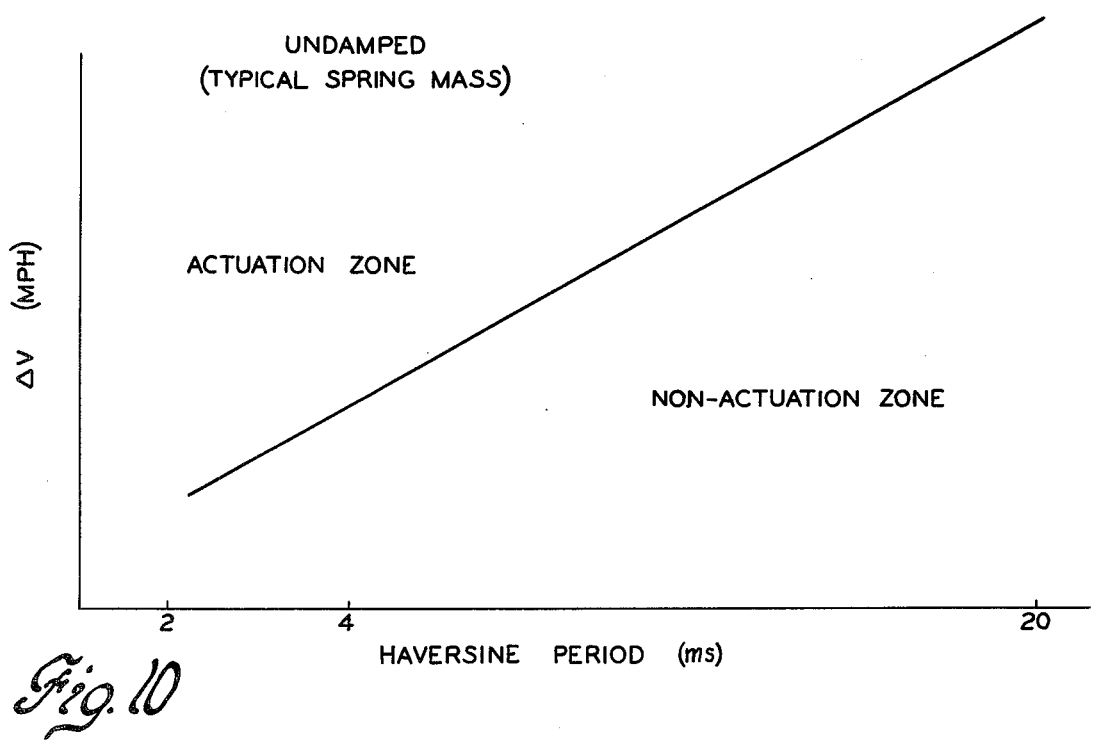
FIG. 10 is a diagram.

The damping can be controlled through the clearance between the band edges and the covers; notching or otherwise altering the profiles of the bands to provide air passages between the bands and covers; by profiling the inner surfaces of the covers 56, such as with passages or grooves interconnecting the zones or ribs transverse to the zones; and by providing the walls 22 with ribs to space the proximal portions 46 from the surfaces of such walls or by castellating the walls. Thus the ΔP, or pressure differential from ambient, in the compression, vacuum and transition zones can be tailored to the desired actuation time. The diagrams of FIGS. 9 and 10 indicate the haversine periods for fully damped and undamped sensors. By tailoring the ΔP in the various zones, the dynamic response of the bands can be varied between those extremes shown above to obtain the desired actuation ΔV threshold.

The proximal portions 44 of the bands between the common anchor 34 and the anchors 36 should be of the same shape in order that their mass be the same. Likewise the distal portions 46 of the bands between the common anchor 34 and the anchor points 36 should likewise be of the same shape in order that their mass be the same. By providing equal masses to the portions of the bands providing the moving mass, the bands will always roll and elongate with respect to the bisector of the included angle.

It will be appreciated that the electrical contacts 48 are connected in a conventional manner through one of the covers 56 to the device to be actuated, a source of power, and a diagnostic system if such is included. Such connection is not shown herein since it forms no part of this invention. However, it is believed obvious that the connection can be either the use of conventional contact pins or otherwise.

Thus this invention provides an improved roller band sensor.

The embodiments of the invention in which an exclusive property or privilege is claimed are defined as follows:

1. A sensor comprising, in combination, a housing including a pair of spaced bearing portions, a pair of flexible bands of spring material disposed between said bearing portions and being forced thereby into generally elongate shape with abutting adjacent portions and remote portions engaging a respective bearing portion, means securing said abutting portions to each other, means securing said remote portions to a respective bearing portion of the housing, a velocity change of predetermined extent applied to said bands causing said bands to concurrently roll relative to each other and along said bearing portions, (indicator means operated by said bands as said bands roll) contact means actuated upon rolling movement of said bands to indicate the occurrence of said velocity change, and means resisting rolling of said bands unless said velocity change occurs.

2. A sensor comprising, in combination, a housing including a pair of spaced elongate bearing portions defining a predetermined included angle, a pair of flexible bands of spring material disposed between said bearing portions and being forced thereby into generally elongate shape with abutting adjacent portions and remote portions engaging a respective bearing portion, means securing said abutting portions to each other, means securing said remote portions to respective bearing portions of the housing, a velocity change of predetermined extent applied to said bands causing said bands to concurrently roll relative to each other and along said bearing portion as said bands further elongate, contact means actuated by said bands as said bands further elongate to indicate the occurrence of said velocity change, and means resisting rolling of said bands unless said velocity change occurs.

3. A sensor comprising, in combination, a housing including a pair of spaced bearing portions tapering relative to each other and defining a predetermined included angle, a pair of flexible bands of spring material disposed between said bearing portions and being forced from their free shape into generally elongate shape with abutting adjacent portions located coplanar with the bisector of the included angle and remote portions engaging a respective bearing portion, means securing said abutting portions to each other, means securing said remote portions to respective bearing portions of the housing, a velocity change of predetermined extent applied to said bands causing said bands to concurrently roll relative to each other and along said bearing portion as said bands further elongate, contact means actuated by said bands as said bands further elongate to indicate the occurrence of said velocity change, and means engageable by said bands under the forces thereof tending to return to their free shape resisting further elongation of said bands unless said velocity change occurs.

4. A sensor comprising, in combination, a housing including a cavity having a pair of spaced elongate side walls tapering relative to each other and defining a predetermined included angle, wall means interconnecting said side walls at the proximal and distal ends thereof, a pair of flexible bands of flat spring material disposed between said side walls and being forced from their free shape into generally elongate shape with abutting adjacent portions located along the bisector of the included angle and remote portions engaging a respective side wall, means commonly securing said abutting portions to each other, means securing each remote portion to a respective side wall of the housing, a velocity change of predetermined extent applied to said bands causing said bands to concurrently roll relative to each other and along said side walls as said bands further elongate toward the proximal wall means, contact means actuated by said bands as said bands further elongate to indicate the occurrence of said velocity change, and means locating said bands adjacent said distal wall means unless said velocity change occurs.

5. An inertia sensor characterized by subsantial absence of coulomb friction, comprising, in combination,
a pair of substantially identical resiliently bendable flat loop members commonly anchored together at their peripheries to form circular connected loops of substantially identical diameters when released, and
a cage for said loop members having one respective portion receiving one loop and a substantially identical other respective portion receiving the other loop, the respective portions opening to each other along a central axis, the respective portions having flat surfaces of substantially identical length against which the flat loop members can bear and which substantially exceed the peripheral length of the respective loop members so as to permit end to end rolling of the loop members in unison, the flat surfaces of the respective portions being spaced transverse to the central axis a lesser extent than said diameters, the transverse spacing of the flat surfaces at one end thereof being greater than at the other end thereof and progressively decreasing from said one end to said other end so that the loop members in the non-accelerating condition travel toward the one end thereof, and contact means at the other end of the flat surfaces responsive to the engagement of the loops therewith to indicate the event of deceleration of the cage in the direction of the central axis.

6. A sensor comprising, in combination, a pair of bands of flexible spring material commonly secured together at their periphery in a FIG. 8 configuration, elongate means engageable by each band opposite their common securement for constraining the FIG. 8 configuration along the major axis thereof and forcing the bands into elongate shape, respective means securing each band to an elongate means, means maintaining the bands in a predetermined preload position relative to said elongate means, a velocity change of predetermined extent applied to said bands causing said bands to concurrently roll relative to each other and to a respective elongate means as the FIG. 8 configuration translates from the preload position to an actuated position, and contact means actuated by said bands at the actuated position to indicate the occurrence of said velocity change.

7. A sensor comprising, in combination, a housing including a pair of spaced bearing portions, a pair of flexible spring bands of ovular shape commonly secured together in FIG. 8 configuration and located transversely between said bearing portions in rolling engagement therewith, means securing each band to a respective bearing portion of the housing, a velocity change of predetermined extent applied to said bands causing said bands to concurrently roll relative to each other and along said bearing portions as the FIG. 8 band configuration translates relative to said housing, and contact means actuated said band configuration upon translation thereof to indicate the occurrence of said velocity change.

* * * * *

UNITED STATES PATENT AND TRADEMARK OFFICE
CERTIFICATE OF CORRECTION

PATENT NO. : 4,157,462
DATED : June 5, 1979
INVENTOR(S) : Houston F. Blanchard

It is certified that error appears in the above-identified patent and that said Letters Patent are hereby corrected as shown below:

Column 8, lines 10 and 11, delete "(indicator means operated by said bands as said bands roll)".

Column 9, line 6, "subsantial" should read -- substantial -- .

Column 10, line 31, after "actuated" insert -- by -- .

Signed and Sealed this

Sixteenth Day of October 1979

[SEAL]

Attest:

RUTH C. MASON
Attesting Officer

LUTRELLE F. PARKER
Acting Commissioner of Patents and Trademarks